Feb. 15, 1944.  P. F. ROSSMANN  2,342,089
RIVET SQUEEZER
Filed April 2, 1941
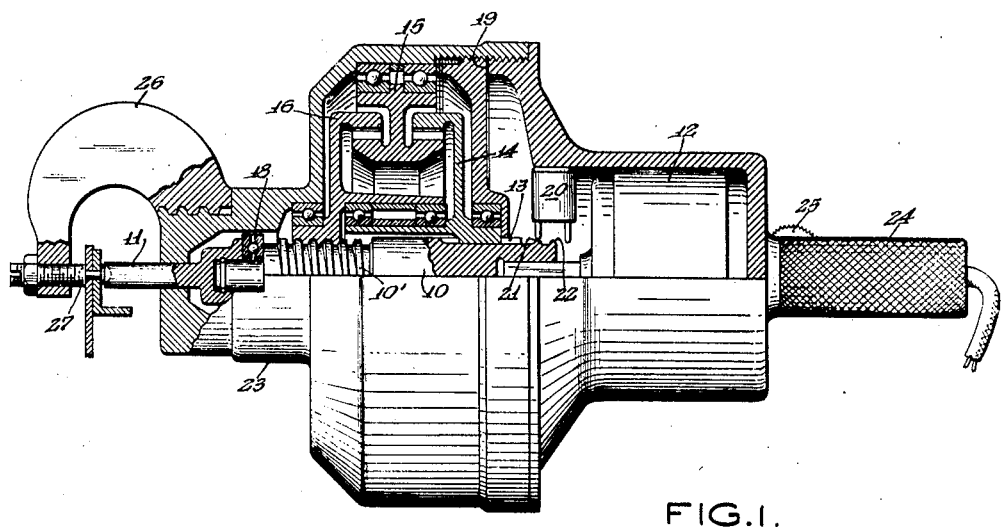
FIG. 1.
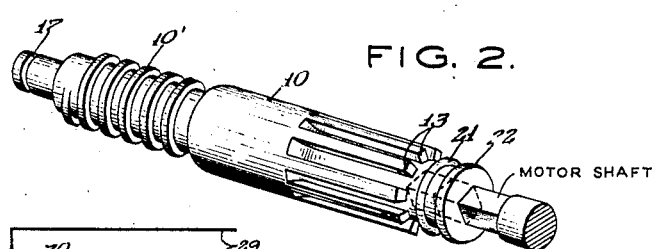
FIG. 2.
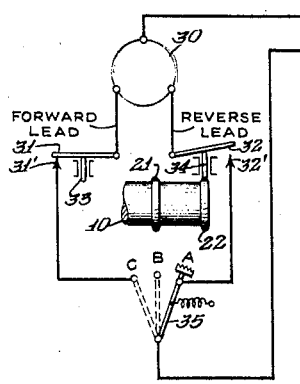
FIG. 3.
FIG. 4.
INVENTOR
Peter F. Rossmann
BY
ATTORNEY Patented Feb. 15, 1944

2,342,089

UNITED STATES PATENT OFFICE 2,342,089

RIVET SQUEEZER

Peter F. Rossmann, Buffalo, N. Y., assignor to Irving Rossi, West Orange, N. J.

Application April 2, 1941, Serial No. 386,474

13 Claims. (Cl. 78—48)

The known rivet squeezers are almost without exception air operated—there are several hydraulic types on the market—and in addition to various other disadvantages and drawbacks involve the use of such devices as air cylinders, packings and the mechanical elements of toggles, cams and other mechanical means for obtaining large forces with relatively low air pressures. It is also well known that air operated devices are notoriously inefficient and subject to various corrosive actions due to high humidity in the air lines and other objectionable conditions that are peculiar to air operated devices. Moreover, the fact that air lines are relatively stiff in bending, limits their application from a flexibility standpoint where it is necessary to use such equipment in limited spaces such as close corners, etc. Finally, the problem of providing air in sufficient quantity and pressure is quite serious especially during the periods of rapid factory expansion and increased manufacturing volume.

An object of the present invention is therefore to provide an electrically operated rivet squeezer which is substantially free from the above mentioned drawbacks and disadvantages inherent in pneumatic or hydraulic devices of this character heretofore known and used in the art.

Another object is to provide a rivet squeezer which is both simple in design and highly efficient and flexible in operation.

Another object is to provide a rivet squeezer enabling accurate and easy cycling or control of its advance and return operating stroke.

These and other objects of the invention will become more apparent from the following detailed description taken with reference to the accompanying drawing forming part of this specification and wherein:

Figure 1 is an elevational view, partly broken away, of a rivet squeezer constructed in accordance with the principles of the invention, Figure 2 is a partial isometric view showing the driving shaft of the device according to Figure 1, and Figures 3 and 4 are electric wiring diagrams for obtaining a semi- and fully automatic riveting operation, respectively, by means of a device according to Figures 1 and 2.

Like reference characters identify like parts in the different views of the drawing.

Referring to the drawing, Figures 1 and 2, the riveting device shown comprises essentially a threaded shaft 10 having a portion forming a worm or translating screw 10' and being provided at its forward end with an anvil or riveting tool 11. Shaft 10 is driven by a high speed electric motor 12 coupled thereto in any suitable manner so as to allow of relative axial movement of the shaft such as by a square shaped extension of the motor shaft slidably engaging a corresponding axial opening of the shaft 10 as shown more clearly in Figure 2. The rear end of the shaft 10 is formed with axial guides or splines 13 arranged to slidably engage corresponding grooves in the hub of a ring gear 14 forming an element of a reduction gear system to reduce the speed of the axial advance of the shaft 10. As an example, gear 14 is assumed to have 40 teeth. Gear 14 meshes with the aft 39 teeth of an externally suspended idler gear 15. The forward end of gear 15 which may possess 38 teeth meshes with a further ring gear 16 having 39 teeth in the example under consideration. The ring gear 16 has a hub fitted with a worm gear to form an internally threaded nut in meshing relation to the worm 10' of shaft 10. The worm, for the sake of illustration, may have a lead or pitch of .250". As a result, an axial displacement of the shaft 10 is caused by engagement with the ring gear 16. The operation, assuming the above numerical values, will be further explained in the following.

The shaft 10 driven by the electric motor 12 rotates the ring gear 14 and in turn by way of the idler gear 15 causes rotation of the ring gear 16 in the same direction as the shaft, but due to the differential gearing ratios of 40 to 39 and 38 to 39 teeth, gear 16 "loses"

$$\frac{1}{40 \cdot 38} = .000658 \text{ revolution}$$

In other words, one revolution of the motor will result only in a relative rotation between gear 16 and shaft 10 of .000658 revolution resulting in an axial movement of the shaft of .0250×.000658=.000165" per revolution. Thus a ¼" advance of the screw 10 will require 1515 revolutions of the motor. This particular phenomenon permits the use of a high speed low torque electric motor since the axial movement of the shaft 10 is of such small magnitude per revolution.

The anvil or riveting tool 11 secured to the shaft 10 which on comparable air operated rivet squeezers advances about ⅜" to ½" is connected to the shaft in any suitable manner such as by means of pins fitted in a groove 17 of the shaft. A thrust bearing 18 is advantageously interposed between the anvil 11 and the shaft 10 so that the rotation of the shaft is not transmitted to the anvil. The entire assembly is mounted on ball bearings of high load capacity, as shown and understood from the drawing, and pre-loaded and adjusted by means of shim adjustments as indicated at 19. The motor 12, shaft 10, and differential gear mechanism are suitably mounted and supported in a housing 23 provided with a handle 24 and thumb operating switch 25. The anvil 11 projects through the forward end of housing 23 and a yoke 26 carrying a cooperating riveting tool 27 is removably connected to the housing such as by a screw thread connection in the manner shown to permit quick interchangeability for various types of yokes. The anvils 11 and 27 may be formed with cavities conforming to the shape of a rivet head or may be flat as may be desired.

According to a further feature of the invention the device is properly cycled by means of limit and reversing switches with or without relays collectively indicated by numeral 20 and actuated by a pair of annular rings 21 and 22 secured to or integral with the shaft 10. The arrangement and circuit connections are such that at the end of its forward stroke the shaft is automatically reversed and returned to its initial starting point, the operating cycle being initiated by the operation of the thumb switch 23 on the handle 24. If necessary, a tortion spring drive could be used to connect the motor with the shaft 10.

An advantage of the invention is due to the fact that the operating switches can be so connected with the thumb switch 22 that the anvil 16 can be gradually inched through its entire stroke or stopped, or if necessary can be reversed by manually moving the thumb switch 22 into the reverse position. In manual service the reversing operation automatically takes place through the micro or limit switches and relays 20. The existing air and hydraulic squeezers do not have this inching feature which is very often necessary where very slowly applied pressure must be accurately controlled.

In Figures 3 and 4 there are shown electrical wiring diagrams for obtaining a semi- or fully automatic riveting operation with a device of the type described hereinabove. Referring to Figure 3, there are provided essentially two mechanically operated switches preferably of the snap action type known in the trade as "Micro" or "Mu" switches. The switches in Figure 3 are of the single contact normally closed type and comprise in a known manner an internally tensioned or biased leaf spring 31 or 32 normally closing contacts 31' and 32' and adapted to break the contact with a snap action by the aid of actuating members 33 and 34 engaging a sensitive area of the leaf springs 31 or 32, respectively. The thumb switch 35 having a knurled actuating member 25, Figure 1, is spring loaded so that normally it is in the reverse motor contact position A as shown in the drawing. The motor which is preferably of the A. C.-D. C. universal type is shown at 30 and provided with forward and reverse leads and energized from a suitable supply source such as an alternating or direct current power line 29. The reverse contact switch 32 in the zero or starting position is broken by the position of the aft actuating ring 22 of shaft 10 engaging the operating member or plunger 34. When the thumb switch 35 is moved to the forward motor contact position C the motor circuit for forward rotation is closed and as shaft 10 moves forward the aft actuating ring 22 will permit switch 32 to close for the reversing cycle. As the forward actuating ring 21 engages the operating member or plunger 33 of switch 31, the latter is opened and the motor stopped. If subsequently the switch 35 is released the motor reverses and will again be automatically stopped when actuating ring 22 engages switch 32 thereby restoring the device to its starting condition. Although this circuit will not automatically reverse the motor at the end of the forward stroke with switch 35 held in position C, it is possible to inch the movement 10 either forward or aft by moving switch 35 from the neutral position B in the direction desired.

The circuit shown in Figure 4 differs from Figure 3 in that switch 31 is of the double contact reset type being provided for this purpose with a further contact 31" located at the side of its leaf spring opposite to the contact 31'. This arrangement affords an automatic reversal of the motor at the forward stroke with the thumb switch 35 held in the forward contact position C. After the automatic contact between spring 31 and contact 31" has been effected by the actuating ring 21, the motor may be stopped in its reverse motion by moving switch 35 to the neutral position B and then may be inched in the reverse stroke but not in the forward direction. This is due to the fact that it is necessary that the aft actuating ring 22 mechanically resets switch 31 such as by means of a lever pivoted at 37 and spring loaded by means of a spring 38. However, in the beginning of the stroke inching is possible in either direction by the same A—B—C positions of switch 35 in substantially the same manner as outlined with reference to Figure 3. Only after the forward actuating ring 21 has operated switch 31, is the inching limited to the reverse direction. The function of lever 36 is purely mechanical and involves no electrical connections. Item 40 is a stop limiting the movement of resetting lever 36.

It will be understood that the number of teeth in the various gears mentioned is merely arbitrary and that many combinations are practical to suit existing requirements. The reason for the external suspension of the idler gear 15 is due to the fact that the axis of the aft ring gear 14 and forward ring gear 16, although parallel, do not coincide with the axis of gear 15.

It will be evident from the foregoing that the invention is not limited to the specific constructions and details disclosed and described herein for illustration, but that the underlying basic principle of the invention is susceptible of numerous variations and modifications coming within the broader scope and spirit of the invention as defined in the appended claims. The specification and drawing are accordingly to be regarded in an illustrative rather than in a limiting sense.

I claim:

1. In a rivet squeezer, a housing, a high speed-low torque electric motor mounted in said housing, a shaft in axially sliding driving engagement with said motor, a worm carried by said shaft, differential gear means having one end thereof arranged in axially sliding driving engagement with said shaft and having a worm gear at its other end meshing with said worm to cause axial movement at substantially reduced speed of said shaft by rotation of said motor, a yoke extending from said housing, and a pair of cooperating riveting tools carried by said shaft and yoke, respectively.

2. In a rivet squeezer, a housing, a high speed-low torque electric motor mounted in said housing, a threaded shaft forming a translating screw in axially sliding driving engagement with said motor, differential gear means having one end thereof arranged in axially sliding driving engagement with said shaft and provided with an internally threaded nut at its other end in meshing engagement with said shaft to cause axial movement at substantially reduced speed of said shaft by rotation of said motor, a yoke extending from said housing, and a pair of cooperating riveting tools carried by said shaft and yoke, respectively.

3. In a rivet squeezer, a housing, an electric motor mounted in said housing, a threaded shaft in axially sliding and driving engagement with said motor, differential gear means having one end thereof arranged in axially sliding driving engagement with said shaft and having an internally threaded nut at its other end in meshing engagement with said shaft to cause axial movement at substantially reduced speed of said shaft by rotation of said motor, a yoke extending from said housing, a pair of cooperating riveting tools carried by said shaft and yoke, respectively, a pair of electric limit switches, and a pair of spaced actuating rings carried by said shaft adapted to operate said limit switches to control the forward and return stroke of said shaft.

4. In a rivet squeezer, a housing, an electric motor mounted in said housing, a threaded shaft in axially sliding driving engagement with said motor, differential gear means having one end thereof arranged in axially sliding driving engagement with said shaft and having an internally threaded nut at its other end in meshing engagement with said shaft to cause axial movement at substantially reduced speed of said shaft by rotation of said motor, a yoke extending from said housing, a pair of cooperating riveting tools carried by said shaft and yoke, respectively, a manually operated switch for starting said motor, and a pair of limit switches and cooperating spaced actuated rings therefor carried by said shaft to control the forward and return stroke of said shaft.

5. In a rivet squeezer, a housing, an electric motor in said housing, a threaded shaft in axially sliding driving engagement with said motor, differential gear means having one end thereof arranged in axially sliding driving engagement with said shaft and having an internally threaded nut at its other end in meshing engagement with said shaft to cause axial movement at substantially reduced speed of said shaft by rotation of said motor, a yoke extending from said housing, a pair of cooperating riveting tools carried by said shaft and yoke, respectively, a manually operated switch for starting said motor, and a first reversing limit switch and a second limit switch and spaced actuating rings therefor carried by said shaft to limit the forward stroke and automatically reverse the movement of said shaft and to stop said shaft upon return to its starting position.

6. In a rivet squeezer, a housing, a high speed-low torque electric motor mounted in said housing, a threaded shaft in axially sliding driving engagement with said motor, differential gear means having one end thereof arranged in axially sliding driving engagement with said shaft and having an internally threaded nut at its other end in meshing engagement with said worm, to cause axial movement at substantially reduced speed of said shaft by rotation of said motor, an extension of said housing concentric to said shaft, a yoke removably threaded onto said extension and a pair of operating riveting tools carried by said shaft and yoke, respectively.

7. In a rivet squeezer, a housing, a high speed-low torque electric motor mounted in said housing, a threaded shaft in axially sliding driving engagement with said motor, a differential gear mechanism comprising a first gear having a hub rotatably mounted upon said housing and arranged in axially sliding driving engagement with said shaft, a second gear having an internally threaded hub rotatably mounted upon said housing and engaging said shaft, and an idler gear rotatable with respect to said housing and having a pair of gear elements meshing with said first and second gears, respectively, the transmission ratio from said first gear to said idler gear to said second gear being such as to cause axial movement of said shaft at substantially reduced speed by rotation of said motor, a yoke extending from said housing, and a pair of cooperating riveting tools carried by said shaft and yoke, respectively.

8. A device of the character described comprising, a housing, a high speed-low torque electric motor mounted in said housing, a threaded shaft in axially sliding driving engagement with said motor, a differential gear mechanism comprising a first ring gear having a hub rotatably mounted upon said housing and arranged in axially sliding driving engagement with said shaft, a second ring gear having an internally threaded hub rotatably carried by said housing in meshing engagement with said shaft, an idler gear externally rotatably mounted in said housing and having aft and forward ring gear elements meshing with said first and second ring gears, respectively, the transmission ratios from said first ring gear to said idler gear to said second ring gear being such as to cause axial movement of said shaft at substantially reduced speed by rotation of said motor.

9. In a rivet squeezer, a housing, a high speed-low torque electric motor mounted in said housing, a threaded shaft carried by said housing in axially sliding driving engagement with said motor, a differential gear mechanism comprising a first gear rotatably mounted within said housing and arranged in axially sliding driving engagement with said shaft, a second internally threaded gear rotatably mounted within said housing and engaging said shaft and an idling gear rotatably mounted within said housing and having front and aft gear elements meshing with said first and second gears, respectively, one of the transmission ratios between said first gear and said idling gear and between said idling gear and said second gear being greater and the other transmission ratio being less than unity to provide a sufficiently small differential therebetween, to cause axial movement of said shaft at substantially reduced speed by rotation of said motor, a yoke extending from said housing, and a pair of cooperating riveting tools carried by said shaft and said yoke, respectively.

10. A device of the character described comprising, a housing, a high speed-low torque electric motor mounted in said housing, a threaded shaft carried by said housing and arranged in axially sliding driving engagement with said motor, a differential gear mechanism, comprising a first gear rotatably mounted within said housing and arranged in axially slidable driving engagement with said shaft, a second internally threaded gear rotatably mounted within said housing and engaging said shaft and an idling gear rotatable within said housing and having front and aft gear elements in meshing relation with said first and second gears, respectively, the transmission ratio between said first gear to said idling gear being greater and the transmission ratio between said idling gear to said second gear being less than unity to provide a sufficiently small differential therebetween to cause axial movement of said shaft at substantially reduced speed during rotation of said motor.

11. Means to transform relatively high speed rotary motion into relatively low speed translatory motion comprising a support, a high speed electric motor mounted upon said support, a threaded shaft carried by said support forming a translating screw in axially sliding driving engagement with said motor, differential gear means having one end thereof arranged in axially sliding driving engagement with said shaft and having an internally threaded nut at its other end meshing with said shaft, to cause axial movement at substantially reduced speed of said shaft by rotation of said motor.

12. A device of the character described comprising a support, an electric motor mounted upon said support, a source of power supply therefor, a first terminal of said motor connected to one pole of said power supply, a threaded shaft forming a translating screw carried by said support and arranged in axially sliding driving engagement with said motor, differential gear means having one end arranged in axially sliding driving engagement with said shaft and having an internally threaded nut at its other end meshing with said shaft to cause axial movement at substantially reduced speed of said shaft by rotation of said motor, a pair of further terminals of said motor each causing rotation of said motor in a different direction by connection to the other pole of said power supply, a pair of normally closed snap action switches mounted upon said support, a pair of axially spaced actuating members for said switches extending from said shaft and adapted to open the associated switch at predetermined fore and aft positions of said shaft, respectively, circuit connections between one terminal of each of said switches and one of said further terminals of said motor, and further switch means carried by said support for connecting either of the remaining terminals of said switches to said other pole of said power supply, to limit the axial movement of said shaft in both directions between two positions determined by the spacing of said switches and actuating members, respectively.

13. A device of the character described comprising a support, an electric motor mounted upon said support, a source of power supply therefor, a first terminal of said motor connected to one pole of said power supply, a threaded shaft forming a translating screw carried by said support and arranged in axially sliding driving engagement with said motor, differential gear means having one end arranged in axially sliding driving engagement with said shaft and having an internally threaded nut at its other end meshing with said shaft to cause axial movement at substantially reduced speed of said shaft by rotation of said motor, a pair of further terminals of said motor each causing rotation of said motor in a different direction by connection to the other pole of said power supply, a pair of normally closed snap action switches mounted upon said support, a pair of axially spaced actuating members for said switches extending from said shaft and adapted to open the associated switch at predetermined fore and aft positions of said shaft, respectively, circuit connections between one terminal of each of said switches and one of said further terminals of said motor, and further switch means carried by said support for connecting either of the remaining terminals of said switches to said other pole of said power supply, to limit the axial movement of said shaft in both directions between two positions determined by the spacing of said switches and actuating members, respectively, a reverse contact for the switch limiting a forward movement of said shaft, and a connection between said reverse contact and said switch means to automatically reverse the movement of said shaft upon arriving in the forward limiting position.

PETER F. ROSSMANN.